United States Patent Office 3,501,530
Patented Mar. 17, 1970

3,501,530
SUBSTITUTED NAPHTHALENONES, NAPHTHA-LENEDIONES AND D-HOMO-β-NOR ESTRA-1,3,5(10),9(11)-TETRAENES
Marinus Los, Trenton, N.J., assignor to American Cyanamid Company, Stamford, Conn., a corporation of Maine
No Drawing. Filed Feb. 27, 1968, Ser. No. 708,488
Int. Cl. A61k 17/06
U.S. Cl. 260—590  8 Claims

ABSTRACT OF THE DISCLOSURE

This invention relates to steroid-like compounds prepared by a series of reactions from 3,4,8,8a-tetrahydro-5,8a-dimethyl-1,6(2H, 7H)-naphthalenedione which have utility as antiovulatory and estrogenic agents in treatment of warm-blooded animals and to a novel process for synthesizing said compounds.

BACKGROUND OF THE INVENTION

Kitahara, Yoshikosi and Oida in the "Tetrahedron Letters": 1763 (1964) disclose the compounds 3',4',8',8'a-tetrahydro - 7' - (hydroxymethylene) - 5',8'a - dimethyl spiro[1,3 - dioxolane - 2,1'(2' - H)-naphthalen]-6'(7'H)-one, having the formula:

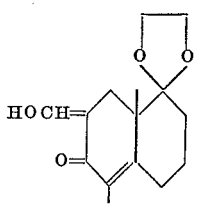

and 3',4',8',8'a - tetrahydro-5,8'a-dimethyl-7'-(N-methyl-anilino - methylene) - spiro[1,3 - dioxolane - 2,1'(2'H)-naphthalen]-6'(7'H)-one having the formula:

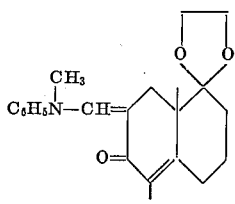

According to the publication, these compounds are intermediates in the total synthesis of dolarbradiene and no other activity for such compounds is provided or suggested.

BRIEF SUMMARY OF THE INVENTION

This invention relates to novel steroid-like compounds represented by the Formulae $a$, $b$ and $c$.

(a)

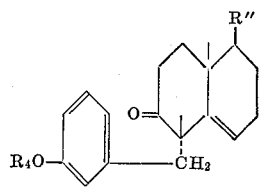

wherein R″ represents a member selected from the group consisting of =O, —OH,

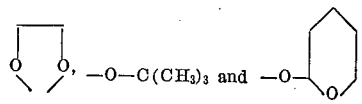

and $R_4$ is a member selected from the group consisting of —H, —CH$_3$, —CH$_2$OCH$_3$ and —CH$_2$C$_6$H$_5$.

(b)

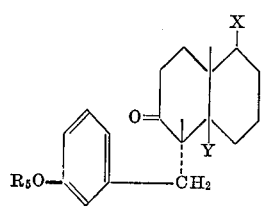

wherein X represents a member selected from the group consisting of =O and —OH; Y is H, either cis or trans to the C$_{13}$ methyl described hereinafter and R$_5$ is selected from the group consisting of —H and —CH$_3$.

(c)

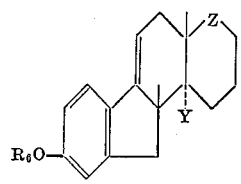

wherein Z is a member selected from the group consisting of

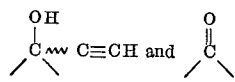

and R$_6$ is selected from the group consisting of —H, —CH$_3$ and

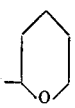

and Y is as described above; and involves the process for the preparation of these compounds of Formulae $a$, $b$, and $c$. Compounds of Formula $a$ correspond ot Formula VIII in the synthesis diagram hereinafter set forth, while Formula $b$ compounds are represented by Formulae IX, X, and XVI in the synthesis diagram and Formula $c$ comounds correspond to Formulae XI, XII, XIII, XIV, XVII and XVIII in said diagram.

PREFERRED EMBODIMENT

In accordance with this invention, the enedione compound of Formula I, is treated with sodium borohydride in the presence of an organic solvent such as ethanol to give the hexahydro-5β-hydroxy naphthalenone of Formula II. Treatment of the thus formed product with isobutylene or dihydropyran, preferably in the presence of an inert solvent such as tetrahydrofuran and methylene chloride and a strong acid catalyst such as hydrochloric acid, phosphorus oxychloride, sulfuric acid, p-toluene sulfonic acid or phosphoric acid saturated with boron trifluoride, yields the corresponding 5β-tetrahydropyranyloxy or 5β-t-butoxy-naphthalenone of Formula III. Where it is desirable to form the monoketal corresponding to Formula III, the enedione is subjected to selective ketalization with ethylene glycol in the presence of an acid such as p-toluene sulfonic acid in an inert solvent such as benzene. Reaction of this monoketal with ethyl formate and an alkali metal lower alkoxide yields the 3-hydroxymethylene ketone of Formula IV. Similarly, treatment of the 5β-t-butoxy or 5β-tetrahydropyranyloxy naphthalenone of Formula III with the same reagents yields the corresponding 3-hydroxymethylene 5β-t-butoxy or 3-hydroxymethylene-5β-tetrahydroxypyranyloxy naphthalenone of Formula IV. The hydroxymethylene compounds of Formula IV having the structure

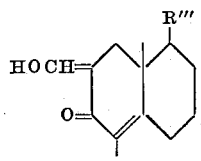

where R''' is t-butoxy, tetrahydropyranyloxy or ethylenedioxy, is then treated with N-methylaniline, preferably in a lower alkanol, to give the corresponding N-methylanilinomethylene compound represented by the Formula V.

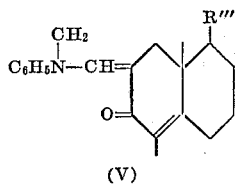

wherein R''' is as defined above. Alkylation of the thus prepared N-methylanilinomethylene compound with a meta-substituted benzylhalide, preferably of the formula:

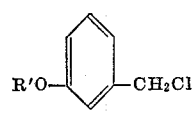

wherein R' is lower alkyl, benzyl or methoxymethylene, at an elevated temperature and in the presence of an alkali metal hydride yields the compounds of Formula VI.

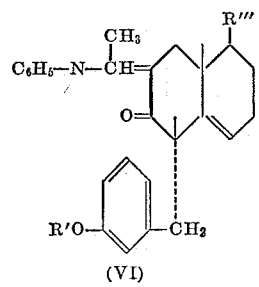

wherein R' and R''' are as described above. Generally, the reaction is carried out at an elevated temperature in an inert atmosphere. The blocking group, i.e., the N-methylanilinomethylene group, is readily removed from the Formula VI compounds by hydrolysis under strongly basic conditions to give the unblocked compounds of Formula VII.

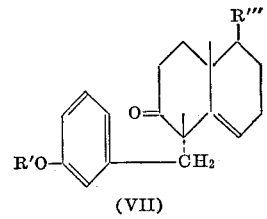

wherein R''' and R' are as defined above. This reaction is generally, most advantageously, carried out at an elevated temperature in the presence of an inert organic solvent such as a glycol ether. Acid hydrolysis of the Formula VII compound where R''' is ethylene dioxy and R' is methyl, yields the diketone depicted by Formula VIII.

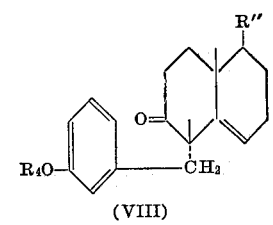

where R'' is oxygen and $R_4$ is methyl. Whereas, acid hydrolysis of the Formula VII compound, where R''' is t-butoxy or tetrahydropyranyloxy and R' is methyl, produces the 5β-hydroxy compound of Formula VIII wherein $R_4$ is methyl. Alternatively, to prepare Formula VIII compounds in which R''' represents OH and $R_4$ is methyl, the diketone can be reduced with hydrogen at an elevated temperature and under superatmospheric pressure in the presence of platinum catalyst. Alternatively, to prepare Formula VIII compounds in which R''' represents OH and $R_4$ is methyl, the diketone can be reduced with sodium borohydride in a lower alkanol. Using a palladium catalyst is ethanol, reduction of the Formula VII compound wherein R''' is ethylene dioxy and R' is benzyl, yields the Formula VIII compound in which R'' is ethylenedioxy and $R_4$ is hydrogen.

The compounds represented by Formula VIII are also prepared directly from the compounds represented by Formula III, synthesis diagram hereinafter, wherein R''' is tetrahydropyranyloxy, t-butoxy or ethylenedioxy by treatment thereof with a meta-substituted benzyl halide preferably of the formula:

wherein R' is lower alkyl, benzyl or methoxymethylene in the presence of a strong base such as potassium t-butoxide or sodium hydride in an inert solvent such as t-butanol or dimethoxyethane.

Reduction of the Formula VIII compound wherein R″ is OH, and $R_4$ is methyl, using a catalyst preferably palladium-on-carbon in a lower alkyl alcohol at about 50° to 100° C., yields the dihydro compound of Formula IX with the hydrogen trans to the $C_{13}$ methyl described hereinafter; whereas reduction of the diketone of VIII under similar conditions yields the diketone for Formula XVI with the hydrogen cis to the $C_{13}$ methyl described hereinafter (see synthesis diagram).

The dihydro alcohol (IX) is oxidized directly to the crystalline diketone of Formula X (synthesis diagram).

Cyclization of compounds (X) or (XVI) with polyphosphoric acid or hydrogen fluoride yield, respectively, the tetracyclic product of Formula XI and XVII, which when treated with acetylene in the presence of strong base give the corresponding acetylenic carbinol of Formula XII and XVIII. Treatment of the tetracyclic compound of Formula XI with pyridine hydrochloride, under an inert atmosphere and at an elevated temperature produces the crude phenol which is acetylated with acetic anhydride and pyridine. The phenol acetate is then hydrolyzed with aqueous alkali to remove the acetate group and give the compound of Formula XIII.

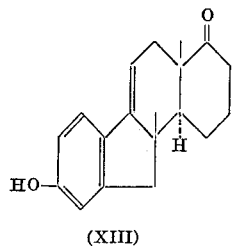

(XIII)

This phenol compound (XIII) is converted to its tetrahydropyranyl derivative by reaction with dihydropyran in the presence of a strong acid catalyst, reacted with acetylene in the presence of strong base yielding the tetrahydropyranyl acetylene which is hydrolyzed with strong acid to the Formula XIV compound.

The following synthesis diagram shows the structures of the present compounds which are specifically indicated in the examples.

SYNTHESIS DIAGRAM

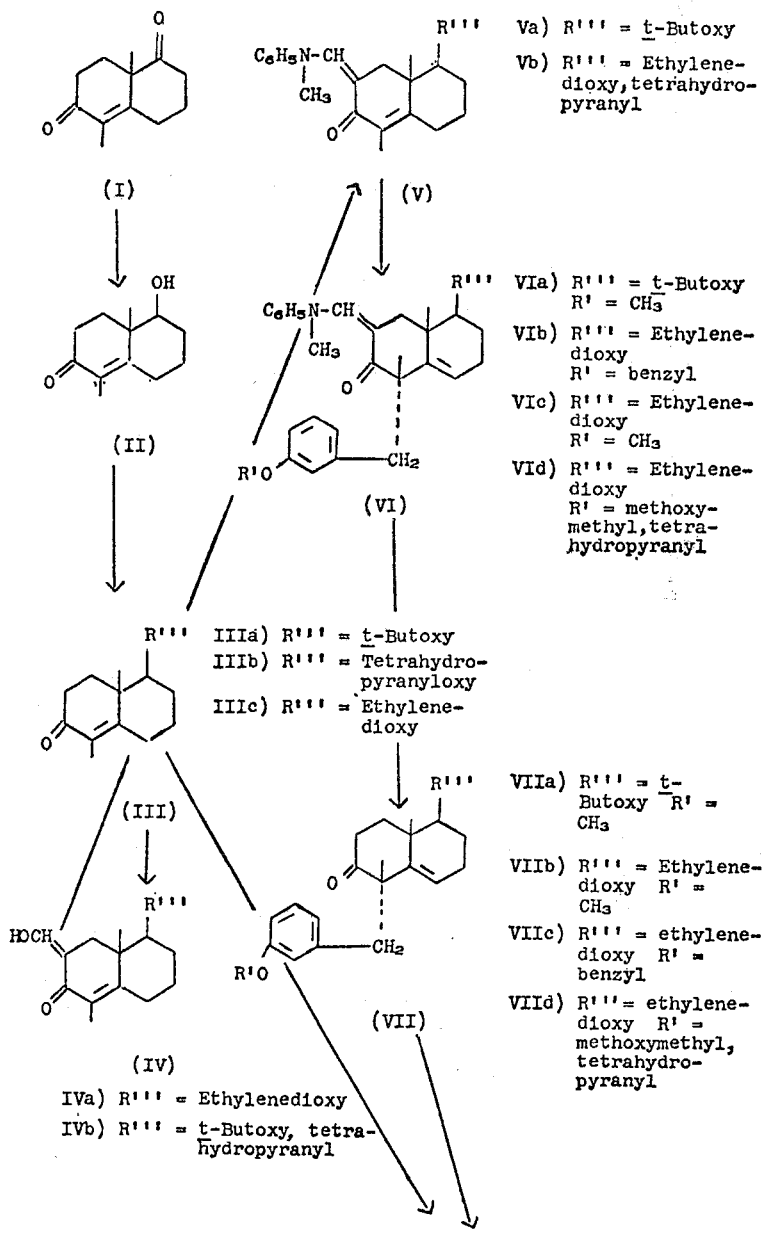

SYNTHESIS DIAGRAM CONTINUED

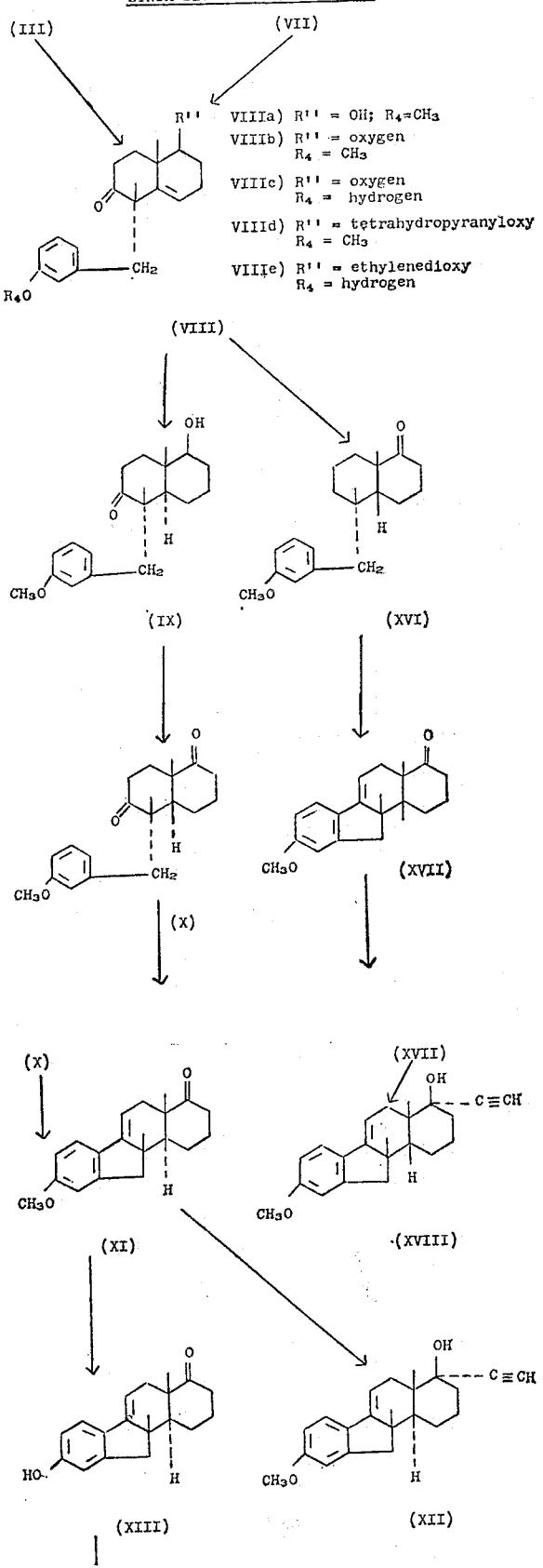

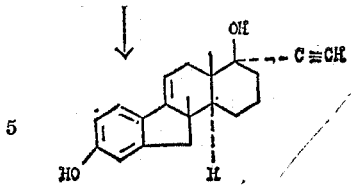

(XIV)

The novel compounds of the invention, represented by the formula (a)

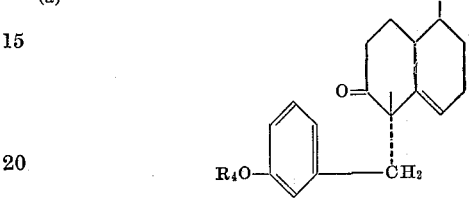

in which R″ is O, OH,

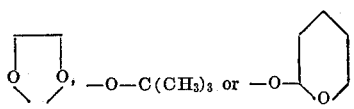, —O—C(CH₃)₃ or —O— and R₄ is H, —CH₃, —CH₂OCH₃ and —CH₂C₆H₅ and (b)

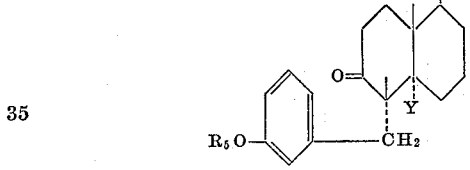

where X is =O or —OH, Y is H, either cis or trans to the 18 methyl and R₅ is H or CH₃; are useful as intermediates, in the synthesis of the estrogenic and antiovulatory compounds of formula (c)

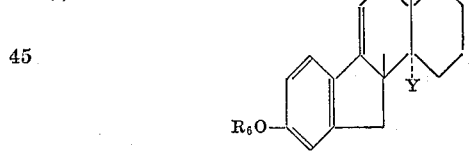

wherein Z is either

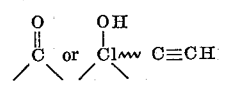

Y is H either cis or trans to the 18 methyl and R₆ is H, —CH₃ or

As indicated, these latter compounds have substantial estrogenic and antiovulatory activity and are useful for controlling the estrus cycle in domestic and laboratory animals such as dogs, cattle, sheep, swine, rabbits, rats, guinea pigs and the like.

In recent years breeders of livestock, domestic pets and laboratory animals have become acutely conscious of the importance of providing a method for the control of estrus cycle in animals. In the breeding of large numbers of animals the advantage of estrus synchronization is, of course, enormous, for such synchronization coupled with subsequent fertilization of the ova results in predictable control of reproduction. This permits the breeder to regulate, to a substantial degree, the numbers of his flocks, herds or colonies and coordinate the development of mature animals with most favorable market conditions.

To regulate or synchronize the estrus cycle in animals using the compounds of the invention as defined by Formula c, the compounds are formulated as liquids or solids for administration orally or parenterally. For injection the compounds may be formulated as described in the examples. They may also be prepared as solid formulations for oral administration in the form of tablets, capsules, powders, pills or the like or they may be prepared as liquids, suspensions, emulsions, solutions and such. In the treatment of small animals such as guinea pigs, rabbits, and rats generally about 0.002 to 10 mg. and preferably 0.05 to 10 mg./head/day is effective to control the estrus cycle.

DETAILED DESCRIPTION

The following examples describe the preparation of specific compounds of the invention and testing as antiovulatory and estrogenic agents.

Example 1.—Preparation of 4,4a,5,6,7,8 - hexahydro-5β-hydroxy-1,4aβ-dimethyl-2-(3H)naphthalenone (II)

A solution containing 58.4 g. (0.304 mole) enedione (I) in 500 ml. absolute ethanol is cooled to 0° with stirring. Then 1.3 g. sodium borohydride is added to the solution and at 15 minute intervals, two more portions of 1.3 g. sodium borohydride is added. Fifteen minutes after the final addition the solution is acidified with acetic acid and then the solvents evaporated. The residue is dissolved in chloroform, the organic phase washed with water, saturated sodium bicarbonate solution, dried and evaporated. The residue is distilled and recrystallized from ether-hexane and has melting point 79°–80° C.

Example 2.—Preparation of 5β-tert-butoxy-4,4a,5,6,7,8-hexahydro-1,4aβ-dimethyl-2(3H)naphthalenone (IIIa)

To a solution containing 4.0 g. (0.0206 mole) of the alcohol (prepared in Example 1) in 20 ml. dry methylene chloride at − 20° C. in a pressure bottle is added approximately 20 ml. of liquid isobutylene. Then 0.5 ml. catalyst (100% phosphoric acid saturated with boron trifluoride) is added, the pressure bottle closed and the mixture shaken at room temperature overnight. The bottle is cooled to −20° C., opened and a stream of dry nitrogen passed through the solution to remove excess isobutylene. The residue is diluted with methylene chloride and washed thoroughly with a saturated sodium bicarbonate solution. The aqueous phase is re-extracted with methylene chloride and the combined organic phases dried and evaporated. The products from a total of four such experiments are combined to give 24.1 g. oil. This is dissolved in hexane and passed through a short column of neutral alumina. After evaporation of the solvent, the residue weighs 20.85 g. The t-butyl ether has boiling point 120°–122° C. at 0.3 mm., $n_D^{25}$ 1.5073.

Example 3.—Preparation of 4,4a,5,6,7,8 - hexahydro-1,4aβ - dimethyl - 5β-[(tetrahydropyran-2-yl)oxy]-2-(3H)-naphthalenone (IIIb)

To a solution containing 1.94 g. (0.01 mole) of alcohol (prepared in Example 1) in 10 ml. dry tetrahydrofuran is added 2.5 ml. of pure dihydropyran followed by 2 drops of phosphorus oxychloride. After standing at room temperature for 4 hours, the solution is poured into saturated bicarbonate solution, extracted with ether and the ether extract dried and evaporated. The residue consists of essentially pure tetrahydropyranyl ether. The infrared spectrum shows no residual hydroxyl group. Other strong acid catalysts such as hydrochloric, sulfuric and p-toluenesulfonic acid may replace the phosphorus oxychloride.

Example 4.—Preparation of 3′,4′,8′,8′a-tetrahydro-5′,8′a-dimethylspiro[1,3 - dioxolane - 2,1′(2′H) - naphthalen] 6′(7′H)-one (IIIc)

To a mixture of 6 g. (3.13 mmoles) enedione (I), 10 ml. ethylene glycol in 180 ml. benzene is added 100 mg. p-toluenesulfonic acid. The solution is heated under reflux under a water separator for 2¼ hours. The cold solution is diluted with ether and washed with sodium bicarbonate solution, water and saturated brine. The residue is filtered through a plug of alumina in benzene and the solvent separated. Crystallization of the residue from hexane at 0° gives 4.6 g. ketal (62.5%), melting point 53–55° C.

Example 5.—Preparation of 3′,4′,8′,8′a-tetrahydro-2′-(hydroxymethylene) - 5′,8′a - dimethylspiro[1,3 - dioxolane-2,1′(2′H)-naphthalen]-6′(7′H)-one (IVa)

In a five liter 3-necked flask equipped with stirrer, dropping funnel and nitrogen inlet, there is placed 100 g. (1.85 moles) sodium methoxide, 1,700 ml. benzene and through the dropping funnel, 265 ml. ethyl formate. After cooling in an ice-water bath, 127.4 g. (0.539 mole) of the ketal (prepared in Example 4) in 640 ml. benzene is added at 0° and stirred overnight at room temperature. The mixture is cooled to 0° and 500 ml. of 2.5 M sodium dihydrogen phosphate solution added. A further 500 ml. phosphate solution, 500 ml. water and 500 ml. benzene is added and the aqueous phase separated. The organic phase is washed with water, dried and evaporated. The residue weighs 143 g. and is the desired compound.

Example 6.—Preparation of 5β-tert-butoxy-4,4a,5,6,7,8-hexahydro - 3 - (hydroxymethylene) - 1,4aβ - dimethyl-2(3H)naphthalenone (IVb)

In a flask equipped with stirrer, thermometer and dropping funnel with nitrogen inlet is placed 111 g. (2.06 moles) of sodium methoxide and 1,900 ml. dry benzene. A nitrogen atmosphere is maintained throughout the reaction. Through the dropping funnel is then added 300 ml. ethyl formate in a stream. The mixture is cooled to 12° C. and 150.5 g. (0.6 mole) of the t-butyl ether (prepared in Example 2) in 700 ml. dry benzene is added dropwise and the mixture stirred overnight. The organic phase is then extracted with water and 2 N sodium hydroxide. The aqueous phases are acidified with 2.5 M sodium dihydrogen phosphate and extracted with ether. The ether extract is washed with water, dried and evaporated to give 164.2 g. of oil. The formyl compound is crystallized from n-propanol and has melting point 76–77° C.

Example 7.—Preparation of 5β-tert-butoxy-4,4a,5,6,7,8-hexahydro - 1,4aβ - dimethyl-3-(N-methylanilinomethylene)-2(3H)naphthalenone (Va)

To a solution containing 2.78 g. (10 mmoles) of the formyl compound (prepared in Example 6) in 10 ml. methanol is added 1.17 g. (11 mmoles) N-methylaniline. The mixture is warmed slightly and then allowed to stand at room temperature overnight. The solvent and excess aniline are removed under reduced pressure to leave 3.5 g. of orange-yellow oil. This material is crystallized from nitromethane and has the melting point 77.5–79° C.

Example 8.—Preparation of 3′,4′,8′,8′a-tetrahydro-5′,8′a-dimethyl - 7′ - (N - methylanilinomethylene)spiro[1,3-dioxolane-2,1′(2′H)naphthalen]-6′(7′H)-one (Vb)

The formyl compound (from Example 5) is dissolved in 900 ml. methanol and 296 ml. (293.2 g., 2.74 moles) of N-methylaniline added. After standing at room temperature, the crystalline product separates and is removed by filtration and washed with hexane. The solvents are removed under vacuum and finally high vacuum to remove excess N-methylaniline. The residue is triturated with 100 ml. of methanol and the crystalline product removed by filtration. The combined crystalline product weighs 165.35 g., melting point 152–153° C.

Example 9.—Preparation of 5β-tert-butoxy-3,4,4a,5,6,7-hexahydro - 1a - (m - methoxybenzyl)-1β,4aβ-dimethyl-3 - (N-methylanilinomethylene) - 2(1H)naphthalenone (VIa)

To a solution containing 79.7 g. (0.217 moles) of the anilino compound (prepared in Example 7) in 850 ml. dry dimethoxyethane under dry nitrogen is added 24.6 g. of 54% sodium hydride (mineral oil suspension). The mixture is stirred and heated under reflux for 2.5 hours. After cooling the solution, 51.1 g. (0.32 mole) m-methoxybenzyl chloride is added and the solution then refluxed. The reaction mixture is cooled in an ice-water bath and water cautiously added to destroy excess hydride. The solution is diluted with water, acidified with 2.5 M sodium dihydrogen phosphate and extracted twice with ether. The ether phase is washed twice with water and evaporated. The residue (133.4 g.) is dissolved in hexane and the product crystallized at 0° C. Recrystallization from n-propanol gives the product, melting point 120.5–121.5° C.

Example 10.—Preparation of 5'α-(m-benzyloxybenzyl)-3',7',8',8'a-tetrahydro - 5'β,8'aβ - dimethyl-7'-(N-methylanilinomethylene) - spiro[1,3 - dioxolane - 2,1'(2'H)-naphthalen]-6'(5'N)-one (VIb)

To a solution containing 5.37 g. (0.0152 mole) of the N-methylanilino compound (prepared in Example 8) in 50 ml. dry dimethoxyethane is added 1.72 g. of 54% sodium hydride (mineral oil suspension). The mixture is stirred and heated at reflux under nitrogen. Then 3.89 g. (0.0167 mole) of n-benzyloxybenzyl chloride in 15 ml. dry dimethoxyethane is added and refluxing continued. The mixture is cooled, water added cautiously followed by excess 2.5 M sodium dihydrogen phosphate. The solution is extracted with methylene chloride, washed with water, and saturated brine, dried and evaporated. The residue (9.4 g.) has infrared and nmr spectra consistent with the structure of the product and is used directly as described in Example 15.

Example 11.—Preparation of 3',7',8',8'a-tetrahydro-5'α-(m-methoxybenzyl) - 5'β,8'aβ - dimethyl-7'-(N-methylanilinomethylene) - spiro[1,3 - dioxolane - 2,1'(2'H)-naphthalen]-6'(5'H)-one (VIc)

In a flask equipped with stirrer, dropping funnel and condenser with nitrogen inlet is placed 223.5 g. (0.632 mole) of the bicyclic compound (prepared in Example 8). Dry dimethoxyethane (2.5 liters) is added, followed by 71.7 g. of 54% sodium hydride in mineral oil. The mixture is heated at reflux under nitrogen, then 147.6 g. (0.943 mole) of m-methoxybenzyl chloride added in a slow stream and refluxing. The reaction mixture is stirred and water added cautiously to decompose excess sodium hydride. The mixture is extracted with methylene chloride. The organic phase is collected and washed with water and saturated brine. After drying over sodium sulfate, the solvent is removed in vacuo and the residue crystallized from ether. The product is recrystallized from acetone-hexane to give a sample melting point 140.5–142° C. Calcd. for $C_{30}H_{35}O_4N$: C, 76.08; H, 7.45; N, 2.96. Found: C, 75.97; H, 7.59; N, 2.88.

Example 12.—Preparation of 5'α-[m-(methoxymethoxy)benzyl] - 3',7',8',8'a - tetrahydro - 5'β,8'aβ - dimethyl-7'-(N-methylanilinomethylene) - spiro[1,3 - dioxolane-2,1'(2'H)-naphthalen]-6'(5'H)-one (VId)

To a solution containing 3.53 g. (0.01 mole) anilino compound (prepared in Example 8) in 125 ml. dry dimethoxyethane under nitrogen is added 1.11 g. sodium hydride (54% mineral oil suspension) and the mixture heated under reflux for 2.5 hours. The mixture is cooled and 2.8 g. (0.015 mole) of m-(methoxymethoxy)benzyl chloride added dropwise. The solution is heated under reflux for 2 hours, cooled and water added cautiously. The solution is further diluted with water and extracted with ether. The ether extract is washed twice with water, dried and evaporated. The residue, an oil, is used without further purification.

Example 13.—Preparation of 5-tert-butoxy-3,4,4a,5,6,7-hexahydro - 1α - (m-methoxybenzyl)-1β,4aβ-methyl-2-(1H)-naphthalenone (VIIa)

To a solution containing 74.9 g. (0.154 mole) of the anilino compound (prepared in Example 9) in 500 ml. 2-ethoxy-ethanol is added a solution containing 146 g. potassium hydroxide in 500 ml. water. The mixture is heated at reflux under nitrogen, for seven hours, then cooled, diluted with water, acidified with 2.5 M sodium dihydrogen phosphate, and extracted with ether. The ether extract is washed with water, dilute hydrochloric acid and water, dried and evaporated. The residual oil weighs 38.9 g. (68%), and has the reference structure described above.

Example 14.—Preparation of 3',7',8',8'a-tetrahydro-5'α-(m-methoxybenzyl) - 5'β,8'aβ - dimethyl-spiro[1,3-dioxolane-2,1'(2'H)-naphthalen-6'(5'H)-one (VIIb)

To a solution of 246.6 g. (0.521 mole) of the N-methylanilino compound (prepared in Example 11) in 1.7 liters of 2-ethoxyethanol is added a solution of 495 g. potassium hydroxide in 1.7 liters of water. The mixture is heated at reflux under nitrogen, cooled and permitted to stand overnight under nitrogen. The solution is diluted with water, extracted with ether, washed with 2 N hydrochloric acid and water, then dried and the solvent evaporated in vacuo. The residue, 176 g. (94.8%) crystallizes completely to a yellow solid, melting point 85–86° C. Calcd. for $C_{22}H_{28}O_4$: C, 74.13; H, 7.92. Found: C, 73.83; H, 7.88.

Example 15.—Preparation of 3',7',8',8'a-tetrahydro-5'α-(m-benzyloxybenzyl)-5'β, 8'aβ-dimethyl-spiro 1,3-dioxolane-2,1'(2'H)-naphthalen-6'-(5'H)-one (VIIc)

The crude alkylated product (0.68 mole prepared in Example 10) is dissolved in 2.2 liters 2-ethoxyethanol and a solution containing 644 g. potassium hydroxide in 2.2 liters water added. The mixture is heated at reflux under nitrogen and then permitted to stand at room temperature overnight, diluted with water and extracted with ether. The extract is washed with water, cold, dilute hydrochloric acid and water. The organic phase is dried and evaporated. The residue is dissolved in 200 ml. ether and 400 ml. hexane added. After standing, the crystalline solid is removed by filtration and washed with ether. Recrystallization from ethanol gives the product, melting point 79–80° C. Calcd. for $C_{28}H_{32}O_4$: C, 77.75; H, 7.46. Found: C, 77.98; H, 7.36.

Example 16.—Preparation of 3',7',8',8'a-tetrahydro-5'α-[m-(methoxymethoxy)-benzyl] - 5'β,8'aβ - dimethyl-spiro[1,3-dioxolane - 2,1'(2'H) - naphthalen]-6'(5'H)-one (VIId)

The crude alkylated product (prepared in Example 12) is dissolved in 28 ml. 2-ethoxyethanol and a solution containing 8 g. potassium hydroxide in 28 ml. water added. The solution is refluxed under nitrogen for 6 hours. The cooled solution is diluted with water and extracted with ether. The ether extract is washed successively with water, 2 N hydrochloric acid, water and saturated brine, dried and evaporated. The residue, an oil, is used without further purificaton.

Example 17.—Preparation of 3,4,4a,5,6,7-hexahydro-5β-hydroxy-1α-(m-methoxybenzyl) - 1β,4aβ - dimethyl-2 (1H)-naphthalenone (VIIIa)

Gaseous hydrogen bromide is passed into 300 ml. chloroform at 0° for one hour. The t-butyl ether (34.8 g., 0.094 mole) (prepared in Example 13 above) in 200 ml. chloroform is then added and the mixture kept at 0° for one hour. The solution is washed with water followed by a saturated solution of sodium bicarbonate, dried and evaporated. The residue is dissolved in a mixture of ether and hexane and kept at 0° overnight. The solid which crystallizes is removed by filtration and washed with hexane. It weighs 25.0 g. (84.6%), melting point 103.5–104° C.

Example 18.—Preparation of 3,7,8,8a-tetrahydro-5α-(m-methoxybenzyl) - 5β,8aβ - dimethyl-1,6(2H,5H)-naphthalenedione (VIIIb)

To a solution of 85.7 g. (0.24 mole) of the ketal, (prepared in Example 14) in 600 ml. ethanol is added 360 ml. 2 N hydrochloric acid and the mixture heated under reflux for one hour. The cooled solution is diluted with water and extracted with ether. The ether extract is washed with water, dried and the solvent evaporated. The residue weighs 74.0 g. (98.6%), boiling point 195° at 1 mm. Calcd. for $C_{20}H_{24}O_3$: C, 76.98; H, 7.74. Found: C, 77.21; H, 8.05. This material can be crystallized from 95% ethanol, melting point 50–51° C.

Example 19.—Preparation of 3,4,4a,5,6,7-hexahydro-5β-hydroxy - 1α - (m-methoxybenzyl)-1β,4aβ-dimethyl-2 (1H)-naphthalenone (VIIIa)

(A) A solution of 2 g. of the diketone (prepared in Example 18) in 50 ml. ethanol is reduced catalytically with hydrogen at 75° C. and 50 p.s.i. pressure in the presence of 150 mgs. platinum oxide. After shaking overnight, the catalyst is removed by filtration and the solvent evaporated in vacuo. The residue is crystallized from ether hexane, then from acetone-hexane, giving the product, melting point 103.5–104° C. Calcd. for $C_{20}H_{26}O_3$: C, 76.40; H, 8.34. Found: C, 76.47; H, 8.30.

(B) To a solution containing 3.12 g. of the diketone (prepared in Example 18) in 50 ml. 95% ethanol is added 500 mgs. sodium borohydride. After stirring at room temperature for 15 minutes, the mixture is diluted with water and extracted with ether. The extract is washed with water, dried and evaporated. The residue is crystallized from acetone-hexane to give 2.73 g. product melting point 101–103° C. identical with that prepared in A.

Example 20.—Preparation of 3′,7′,8′,8′a-tetrahydro-5′α-(m-hydroxybenzyl) - 5′β,8′aβ - dimethyl-spiro[1,3-dioxolane-2,1′(2′H)naphthalen]-6′(5′H)-one (VIIIe)

A solution containing 18.6 g. of the benzyloxy compound (prepared in Example 15) in 200 ml. absolute ethanol is hydrogenated at room temperature and an initial pressure of 50 p.s.i. in the presence of 2 g. 5% palladium-on-carbon. The catalyst is removed by filtration and the solvent removed in vacuo. The residue crystallizes on trituration with ether. The yield of crystalline phenol is 5.9 g. which on recrystallization from 2-propanol has the melting point 155–156° C. Calcd. for $C_{21}H_{26}O_4$: C, 73.66; H, 7.65. Found: C, 73.86; H, 72.82.

Example 21.—Preparation of 3,7,8,8a-tetrahdro-5α-(m-hydroxybenzyl)-5β,8aβ-dimethyl - 1,6(2H,5H) - naphthalenedione (VIIIc)

To 51.6 g. (0.151 mole) of the ketal (Example 20) in 300 ml. 95% ethanol is added 100 ml. of 2 N hydrochloric acid and the mixture heated under reflux for 2.5 hours. After cooling, the mixture is diluted with water and extracted with ether. The ether extract is dried and the solvent evaporated. The residue crystallizes completely to give 45.7 g. (100%) diketone. Recrystallization of this material from toluene gives the product, melting point 120.5–121.5° C. Calcd. for $C_{19}H_{22}O_3$: C, 76.48; H, 7.43. Found: C, 76.32; H, 7.40.

Example 22.—Preparation of 5β - [(tetrahydropyran - 2-yl) - oxy]3,4,4a,5,6,7 - hexahydro - 1α - (m - methoxybenzyl) - 1β,4aβ - dimethyl - 2(1H) - naphthalenone (VIIId)

To 2.78 g. (10 mmoles) unsaturated ketone (prepared in Example 3) in 50 ml. dry t-butanol is added 2.8 g. (25 mmoles) potassium t-butoxide and the mixture refluxed with stirring under nitrogen for 2 hours. The mixture is cooled to 20° C. and 1.88 g. (12 mmoles) m-methoxybenzyl chloride in 5 ml. dry t-butanol added. After stirring for one hour, the mixture is diluted with water and extracted with ether. The ether extract is washed with water, dried and evaporated to leave 5.1 g. of crude product which is used directly for the next step. In this reaction the tetrahydropyranyloxy group in the starting material can be replaced by t-butoxy or ethylenedioxy to give the corresponding alkylated products. Similarly, m-methoxybenzyl chloride may be replaced by m-benzyloxybenzyl or m-(methoxymethoxy)-benzyl chlorides to give the corresponding alkylated products.

Example 23.—Preparation of 3,7,8,8a-tetrahydro-5α-(m-hydroxyzenzyl) - 5β,8aβ - dimethyl - 1,6(2H,5H)-naphthalenedione (VIIIc)

The crude product of Example 16 is dissolved in a mixture of 100 ml. ethanol and 20 ml. 2 N hydrochloric acid and the solution heated under reflux for 3 hours. The cooled mixture is diluted with water and extracted with ether. The ether is then extracted twice with 2 N potassium hydroxide solution. The basic extracts are combined and acidified with concentrated hydrochloric acid. The ether extract is washed with water, dried and evaporated and the residue crystallized from toluene to give the crystalline phenol identical with that prepared in Example 21.

Example 24.—Preparation of 3,4,4aα,7,8,8a-hexahydro-5α(m - methoxybenzyl) - 5β,8aβ - dimethyl - 1,6(2H, 5H)-naphthalenedione (IX and X)

A solution containing 22.0 g. (70 mmoles) of the alcohol (prepared in Example 17) in 240 ml. absolute ethanol is hydrogenated at 73° C. and an initial pressure of 50 p.s.i. in the presence of 5 g .of 5% palladium-on-carbon. The solution is cooled and the catalyst removed by filtration. The solvent is removed in vacuo and the residue in ether filtered through a plug of activated magnesium silicate. Evaporation of the ether gives 21.5 g. of oil, (IX) used directly in the oxidation. The alcohol prepared above is dissolved in 300 ml. of acetone and cooled with stirring to 0° C. The mixture is then triturated with 6 N chromic acid in sulfuric acid until the supernatant becomes a permanent reddish-brown color. The mixture is then diluted with water and extracted with ether. The ether extracts are washed with water and saturated brine. After drying the extract, the solvents are removed under reduced pressure and the residue recrystallized from ether-hexane to give 17.7 g. (80.4% over all yield) of trans-diketone, melting point 91–92° C. Calcd. for $C_{20}H_{26}O_3$: C, 76.40; H, 8.34. Found: C, 76.32; H, 8.43.

Example 25.—Preparation of 3-methoxy-8β-methyl-D-homo - B - nor - estra - 1,3,5(10),9(11) - tetraen - 17a-one (XI)

To about 25 ml. of polyphosphoric acid is added 500 mgs. of the diketone (prepared in Example 24). The mixture is stirred vigorously for five minutes and then excess ice added with stirring. The mixture is further diluted with water and thoroughly extracted with ether. The extract is washed with water, dried and the solvent evaporated. The residue is crystallized from acetone-hexane, then from absolute ethanol to give the sample, melting point 152.5–154°. Calcd. for $C_{20}H_{24}O_2$: C, 81.04; H, 8.16. Found: C, 80.78; H, 8.18.

Example 26.—Preparation of 17aα-ethynyl-3-methoxy-8β-methyl - D - homo - B - nor - estra - 1,3,5(10),9(11)-tetraen-17aβ-ol (XII)

Acetylene (purified) is passed into a stirred suspension of 200 mgs. sodium hydride (54% suspension in mineral oil) in 30 ml. dry dimethyl formamide at −10°. Then 296 mgs. (1 mmole) of the ketone (prepared in Example 25) in 10 ml. dry dimethyl formamide is added dropwise and acetylene bubbled through the stirred solution.

The reaction mixture is diluted with water, acidified with 6 N sulfuric acid and extracted with ether. The extract is washed with water, dried and evaporated. The residue is crystallized from acetone-hexane to give product, melting point 160–162° C. Calcd. for $C_{22}H_{26}O_2$: C, 81.95; H, 8.13. Found: C, 81.92; H, 8.01.

Example 27.—Preparation of 3 - hydroxy-8β-methyl-D-homo - B - nor - estra - 1,3,5(10),9(11) - tetraen - 17a-one (XIII)

A mixture of the methoxy compound (5.0 g., 0.017 mole) (prepared in Example 25) and pyridine hydrochloride (30.0 g.) is heated under nitrogen at 220° C. for 100 min. The mixture is cooled and partitioned between water and ether. The aqueous phase is re-extracted and the combined organic phases washed with water, dried and evaporated. The crude phenol is acetylated with acetic anhydride (25 ml.) and pyridine (5 ml.) for 16 hours at room temperature. The solvents are removed under pressure, the residue dissolved in ether and the ether washed with dilute hydrochloric acid and water. The ether extract is dried and evaporated. The residue is crystallized from ethanol to give 3.5 g. of the phenol acetate. The acetate (3.5 g.) is then dissolved in 100 ml. ethanol and 20 ml. 2 N potassium hydroxide added. The mixture is heated under reflux for one hour. The cooled solution is diluted with water, acidified with concentrated hydrochloric acid and extracted with ether. The ether extract is washed with water, dried and evaporated. Crystallization of the residue from ethanol gives 2.07 g. of phenol, melting point 198–200° C. The analytical sample has melting point 204–205° C. Calcd. for $C_{19}H_{22}O_2$: C, 80.81; H, 7.85. Found: C, 80.52; H, 7.86.

Example 28.—Preparation of 17aα-ethynyl-8β-methyl-D-homo - B - nor - estra - 1,3,5(10),9(11) - tetraene - 3-17aβ-diol (XIV)

The phenol (prepared in Example 27) is first converted to its tetrahydropyranyl derivative by the reaction of the phenol with pure dihydropyran in tetrahydrofuran in the presence of phosphorus oxychloride. Other strong acid catalysts such as hydrochloric and p-toluenesulfonic acid may be used. The crude ether has melting point 123–127° C. and is used without further purification. Pure-dry acetylene is bubbled through a stirred suspension of 800 mgs. sodium hydride (54% mineral oil suspension) in 100 ml. dry dimethyl formamide at −10° C. After one hour, a solution of the tetrahydropyranyl ether (1.46 g., 4 mmoles) in 30 ml. pure dimethylformamide is added dropwise. The passage of acetylene is continued for 3 hours at −10° C. Water is cautiously added and the mixture then diluted with water, acidified with sodium dihydrogen phosphate solution and extracted with ether. The ether extracts are washed twice with water, dried and evaporated. The residue is crystallized from acetone-hexane to give 1.2 g. of the tetrahydropyranyl acetylene, melting point 134–136° C. The analytical sample has, melting point 138–139° C.

The tetrahydropyranyl ether above (1.2 g.) is hydrolyzed by adding 2 N hydrochloric acid (5 ml.) to the compound dissolved in methanol (40 ml.) at room temperature. After standing at room temperature for 15 minutes, the mixture is diluted with water and extracted with ether. The extract is washed twice with water, dried and evaporated. The residue is crystallized from acetone-hexane to give 750 mg. product melting point 205–208° C. The analytical sample has the melting point 208–209° C.

Example 29.—Preparation of 3,4,4aβ,7,8,8a-hexahydro-5α-(m-methoxybenzyl)-5β,8aβ-dimethyl - 1,6(2H,5H)-naphthalenedione (XVI)

A solution containing 31.2 g. (0.1 mole) of the diketone (prepared in Example 18) in 250 ml. ethanol is reduced at 70° C. and 60 p.s.i. in the presence of 5.0 g. 5% palladium-on-carbon. Shaking is continued for about 48 hours. The solution is cooled, the catalyst removed by filtration and the solvent removed in vacuo. The residue is crystallized from a mixture of hexane, acetone and ether to give 20.15 g. of product, melting point 102–103.5° C. Calcd. for $C_{20}H_{26}O_3$: C, 76.40; H, 8.34. Found: C, 76.53; H, 8.29.

Example 30.—Preparation of 3-methoxy - 3β - methyl-D-homo-B-nor-14β-estr - 1,3,5(10),9(11) - tetraen-17α-one (XVII)

To approximately 200 g. polyphosphoric acid is added with stirring at room temperature 5.0 g. of the diketone (prepared in Example 29) in 10 ml. benzene. After five minutes, the mixture is treated with excess ice, further diluted with water and extracted with ether. The ether extract is washed with water, dried and evaporated. The residue is crystallized from ether-hexane then from ethanol to give product, melting point 93–94° C. Calcd. for $C_{20}H_{24}O_2$: C, 81.04; H, 8.16. Found: C, 80.88; H, 8.12.

Example 31.—Preparation of 17aα-ethynyl-3-methoxy-8β-methyl - D - homo-B-nor-14β-estra-1,3,5(10),9(11)-tetraen-17aβ-ol (XVIII)

Acetylene (purified) is passed into a stirred suspension of 400 mgs. sodium hydride (54% suspension in mineral oil) and 40 ml. dry dimethyl formamide at −10° C. for one hour. Then 592 mgs. (2 mmoles) of the ketone (prepared in Example 31) in 15 ml. dry dimethyl formamide is added dropwise. Acetylene is slowly bubbled through the stirred solution at −10° C. for three hours. The flow of acetylene is stopped and water very carefully added to destroy the acetylide. The reaction mixture is diluted with water, acidified with 6 N sulfuric acid and extracted with ether. The extract is washed with water, dried and evaporated. The residue is crystallized from acetonehexane to give the product, melting point 148–149° C. Calcd. for $C_{22}H_{26}O_2$: C, 81.95; H, 8.13. Found: C, 82.20; H, 7.97.

Example 32.—Preparation of diet

The diet employed in the following tests to determine the efficacy of the compounds of the invention as antiovulatory agents and as estrogenic substances is provided below.

| Diet: | Percent |
|---|---|
| Crude protein (min.) | 24.0 |
| Crude fat (min.) | 4.0 |
| Crude fiber (max.) | 4.5 |

Ingredients.—Animal liver meal, fish meal, dried whey, corn and wheat flakes, ground yellow corn, ground oat groats, dehulled soybean meal, wheat germ meal, wheat middlings, cane molasses, dihydrated alfalfa meal, soybean oil, brewers dried yeast, vitamin A palmitate, irradiated dried yeast (source of vitamin $D_2$), riboflavin, niacin, calcium pantothenate, choline chloride, D-activated animal sterol, a-tocopherol, thiamine hydrochloride, menadione sodium bisulfite (source of vitamin K activity), dicalcium phosphate, salt and traces of: manganous oxide, copper sulfate, iron carbonate, potassium iodate, cobalt sulfate and zinc oxide.

Example 33.—Antiovulatory test

Adult female rats of Wistar origin weighing approximately 170 to 180 grams each are used as the test animal. Starting on the day of vaginal estrus, test compounds are given by subcutaneous injections once daily for five successive days in 1 ml. of injection vehicle. The injection vehicle is:

0.5 gm. carboxymethylcellulose (low viscosity)
0.4 gm. Tween 80
0.9 gm. sodium chloride
10.0 ml. polyethylene glycol (Carbowax)
90.0 ml. distilled water Twenty-four hours after the last injection of test compound the rats are sacrificed and the uteri, oviducts and ovaries are removed. The oviducts and a small segment of the uterine horn are separated from the remainder of the uterine horn and ovaries. These oviducts are then flushed with physiological saline to determine if ova are present. A compound is considered antiovulatory if none of 6 treated female rats ovulate (have ova in the oviducts). All animals received a commercial laboratory animal ration ad libitum and fresh water is available at all times while on test. Test results are shown in the following Table I.

TABLE I

| Compound | Dose blocking ovulation |
|---|---|
| 17a α-ethynyl-3-methoxy-8β-methyl-D-homo-B-nor-estra-1, 3, 5(10), 9(11)-tetraen-17αβ-ol (XII). | 1.0 mg./rat/day. 10.0. mg./rat/day. |
| 17a α-Ethynl-8β-methyl-D-homo-B-nor-estra-1, 3, 5(10), 9(11)-tetraene-3, 17αβ-diol (XIV). | 0.5 mg./rat/day and above. |

Example 34.—Estrogen assay

Immature female Wistar original rats are 19 to 21 days of age and are employed as the test animal to determine estrogenic activity of candidate compounds. Test compounds are given by subcutaneous injections once daily for three successive days in 0.2 ml. of injection vehicle. This injection vehicle is:

0.5 gm. carboxymethylcellulose (low viscosity)
0.4 gm. Tween 80
0.9 gm. sodium chloride
10.0 ml. polyethylene glycol (Carbowax 300)
90.0 ml. distilled water Twenty-four hours after the third injection the rats are sacrificed, the uteri removed and dissected free from the ovaries, oviducts and mesentery. Each uterine horn is split longitudinally and the uterine fluid blotted dry. The uteri are weighed to the nearest milligram on a balance. Ten rats are used for each treatment. Increased uterine weight over the control (untreated) uteri indicates estrogenic activity. All animals receive a commercial laboratory animal ration ad libitum and fresh water is available at all times while on test. The following Table II summarizes testing results.

TABLE II

| Compound | Effective dose (mg./rat/day) |
|---|---|
| 3-methoxy-8β-methyl-D-homo-B-nor-estra-1, 3, 5(10), 9(11)-tetraen-17β-one (XI) | 0.5 |
| 17aα-ethynl-3-methoxy-8β-methyl-D-homo-B-nor-estra-1, 3, 5(10), 9(11)-tetraen-17aβ-ol (XII) | 0.002 |
| 17aα-ethynyl-8β-methyl-D-homo-B-nor-estra-1, 3, 5(10),-9(11)-tetraene-3, 17aβ-diol (XIV) | 2.0 |
| 3-methoxy-8β-methyl-D-homo-B-nor-14β-estra-1, 3, 5(10)-9(11)-tetraen-17a-one (XVII) | 0.032 |
| 17a α-ethynyl-3-methoxy-8β-methyl-D-homo-B-nor-14β-estra-1, 3, 5(10), 9(11)-tetraen-17aβ-ol (XVIII) | 0.5 |
|  | 0.125 |

I claim:
1. A compound selected from the group consisting of those represented by the Formulas a, b and c:

(a)

wherein R" is a member selected from the group consisting of O, OH, $$\underset{O}{\square}\underset{O}{\square}, \ -O-(CH_3)_2 \ \text{and} \ -O-\underset{O}{\square}$$

and $R_4$ is a member selected from the group consisting of H, $CH_3$, $-CH_2-O-CH_3$ and $-CH_2C_6H_5$.

(b)

wherein X represents a member selected from the group consisting of O and OH; Y is H, either cis or trans to the $C_{13}$ methyl and $R_5$ is selected from the group consisting of H and $CH_3$.

(c)

wherein Z is a member selected from the group consisting of $$\underset{|}{\overset{OH}{C}}\text{\textasciitilde}C\equiv CH \ \text{and} \ \underset{\diagup \diagdown}{\overset{O}{\underset{\|}{C}}}$$

and $R_6$ is selected from the group consisting of H, $CH_3$ and and Y is H, either cis or trans to $C_{13}$ methyl.

2. A compound according to claim 1, in which the formula is:

wherein R" represents a member selected from the group consisting of O, OH, $$\underset{O}{\square}\underset{O}{\square}, \ -O-(CH_3)_3 \ \text{and} \ -O-\underset{O}{\square}$$

and $R_4$ is a member selected from the group consisting of H, $CH_3$, $-CH_2OCH_3$ and $-CH_2C_6H_5$.

3. The compound according to claim 2: 3,4,4a,5,6,7-hexahydro-5β-hydroxy-1α - (m-methoxybenzyl) - 1β,4aβ-dimethyl-2 (1H)-naphthalenone.

4. A compound according to claim 1, in which the formula is:

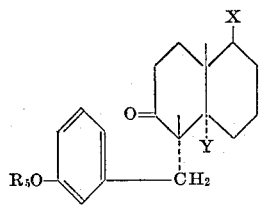

wherein X represents a member selected from the group consisting of O and OH; Y is H, either cis or trans to the $C_{13}$ methyl and $R_5$ is selected from the group consisting of H and $CH_3$.

5. The compound according to claim 4: 3,4,4a$\alpha$,7,8,8a-hexahydro-5$\alpha$(m-methoxybenzyl) - 5$\beta$,8a$\beta$ - dimethyl-1,6 (2H,5H)-naphthalenedione.

6. A compound according to claim 1, in which the formula is:

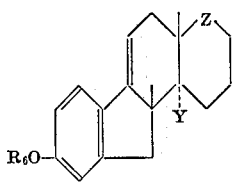

wherein Z is a member selected from the group consisting of

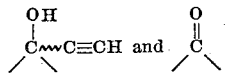

and $R_6$ is selected from the group consisting of H, $CH_3$ and

and Y is H, either cis or trans to 13 methyl.

7. 3-methoxy-8$\beta$-methyl-D-homo-B-nor-estr-1,3,5(10), 9(11)-tetraen-17$\alpha$-one.

8. 17a$\alpha$-ethynyl-3-methoxy-8$\beta$ - methyl-D-homo-B-nor-estra-1,3,5(10),9(11)-tetraen-17a$\beta$-ol.

References Cited

UNITED STATES PATENTS 3,155,729   11/1964   Johns _____ 260—590
3,317,566   5/1967   Stanley et al. _____ 260—590

OTHER REFERENCES

Barnes et al.: J. Org. Chem. 27, 4562–4566 (1962).

DANIEL D. HORWITZ, Primary Examiner

U.S. Cl. X.R.

260—340.9, 345.9, 613, 586, 576; 424—331, 278, 341.